(12) United States Patent
Abe et al.

(10) Patent No.: US 9,823,466 B2
(45) Date of Patent: Nov. 21, 2017

(54) OPTICAL PATH CHANGING DEVICE AND PROJECTION IMAGE DISPLAY APPARATUS

(71) Applicant: Panasonic Intellectual Property Management Co., Ltd., Osaka (JP)

(72) Inventors: Takaaki Abe, Osaka (JP); Masutaka Inoue, Osaka (JP); Takaaki Gyoten, Hyogo (JP); Ryoji Okubo, Osaka (JP); Akiyoshi Yamaguchi, Osaka (JP); Kazuma Tani, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/179,975

(22) Filed: Jun. 11, 2016

(65) Prior Publication Data

US 2017/0003579 A1 Jan. 5, 2017

(30) Foreign Application Priority Data

Jul. 3, 2015 (JP) .................. 2015-134014
Jun. 7, 2016 (JP) .................. 2016-113178

(51) Int. Cl.
| | | |
|---|---|---|
| *G02F 1/00* | (2006.01) | |
| *G02B 26/08* | (2006.01) | |
| *H04N 9/31* | (2006.01) | |
| *G03B 21/14* | (2006.01) | |
| *G03B 21/20* | (2006.01) | |
| *G03B 21/00* | (2006.01) | |

(52) U.S. Cl.
CPC ......... *G02B 26/0875* (2013.01); *G03B 21/14* (2013.01); *H04N 9/317* (2013.01); *H04N 9/3114* (2013.01); *G03B 21/008* (2013.01); *G03B 21/204* (2013.01)

(58) Field of Classification Search
CPC ........ H04N 9/31; H04N 9/3164; H04N 9/312; H04N 9/3161; H04N 9/3114; H04N 9/317; G03B 21/14; G03B 21/00; G03B 21/20; G03B 21/142; G03B 21/204; G03B 21/008; G02B 26/08; G02B 26/0875
USPC .................................. 348/759, 744
See application file for complete search history.

(56) References Cited

U.S. PATENT DOCUMENTS

| | | | | |
|---|---|---|---|---|
| 8,767,172 | B2* | 7/2014 | Ebihara ............... | G03F 7/70808 355/53 |
| 9,268,216 | B2* | 2/2016 | Peijster .................. | G03B 27/42 |
| 2002/0163741 | A1* | 11/2002 | Shibazaki .............. | G02B 7/022 359/819 |

FOREIGN PATENT DOCUMENTS

JP 2007-206567 8/2007

* cited by examiner

*Primary Examiner* — Trang U Tran
(74) *Attorney, Agent, or Firm* — McDermott Will & Emery LLP (57) ABSTRACT

The optical path changing device of the present disclosure includes an optical member having a parallel plate face for changing an optical path, and first, second, and third actuators. The first, the second, and the third actuators are connected with the optical member at first, second, and third vertices of a triangle imaginarily drawn on a plane parallel to the parallel plate face of the optical member. The first, the second, and the third actuators drive the optical member forward and backward in a normal direction of the parallel plate face at the first, the second, and the third vertices serving as points of load. The optical member has a center of gravity within the triangle when seen from the normal direction.

8 Claims, 11 Drawing Sheets

OPTICAL PATH CHANGING DEVICE AND PROJECTION IMAGE DISPLAY APPARATUS

BACKGROUND

1. Technical Field

The present disclosure relates to an optical path changing device for moving the projection position of images, and also to a projection image display apparatus including the device.

2. Description of the Related Art

Patent Literature 1 discloses a pixel-position moving device in which four piezoelectric elements for supporting the four corners of a parallel plate glass are disposed between a fixed pixel display which optically modulates images and a rectangular parallel plate glass which moves the pixel position of projection images. This device is required to use four piezoelectric elements and also to control them asymmetrically to move pixels.

CITATION LIST

Patent Literature

PTL 1: Japanese Unexamined Patent Application Publication No. 2007-206567

SUMMARY

It is an object of the present disclosure is to provide an optical path changing device in which an optical member for moving the projection position of images (pixels) under simple control is rotated about two orthogonal axes of rotation by three actuators. It is another object of the present disclosure to provide a projection image display apparatus including the device.

The optical path changing device of the present disclosure includes an optical member having a parallel plate face for changing an optical path, and first, second, and third actuators. The first, the second, and the third actuators are connected with the optical member at first, second, and third vertices of a triangle imaginarily drawn on a plane parallel to the parallel plate face of the optical member. The first, the second, and the third actuators drive the optical member forward and backward in a normal direction of the parallel plate face at the first, the second, and the third vertices serving as points of load. The optical member has a center of gravity within the triangle when seen from the normal direction.

According to the present disclosure, images can be projected by moving them in two orthogonal directions using three actuators.

DETAILED DESCRIPTION

Preferred embodiments will be described in detail as follows with reference to the accompanying drawings. However, in order to avoid redundancy and help those skilled in the art understand these embodiments, descriptions of well-known matters and substantially the same configuration as described earlier will be omitted.

Note that the attached drawings and the following description are provided to make those skilled in the art fully understand the present disclosure and are not intended to limit the subject of the claims.

First Exemplary Embodiment

Configuration

Figure 1:
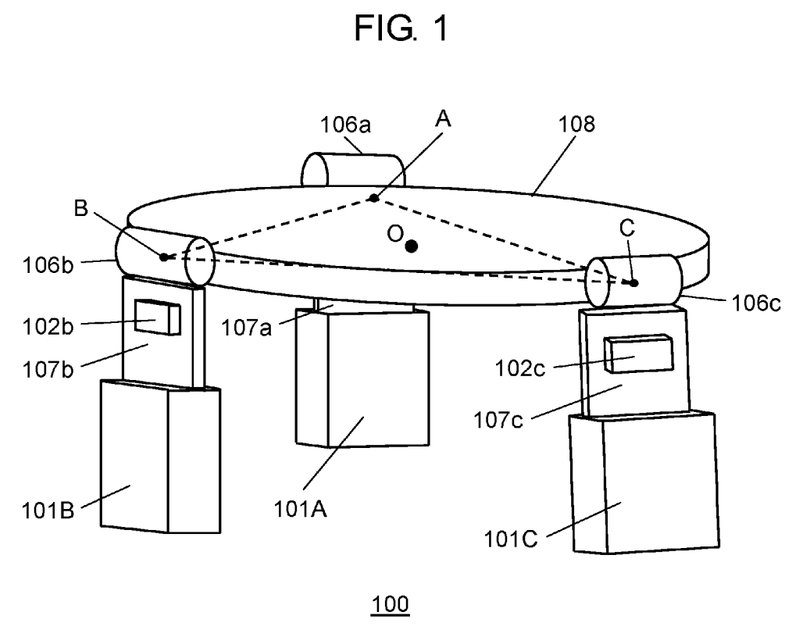
FIG. 1 is an external perspective view of an optical path changing device according to a first embodiment.
Figure 2:
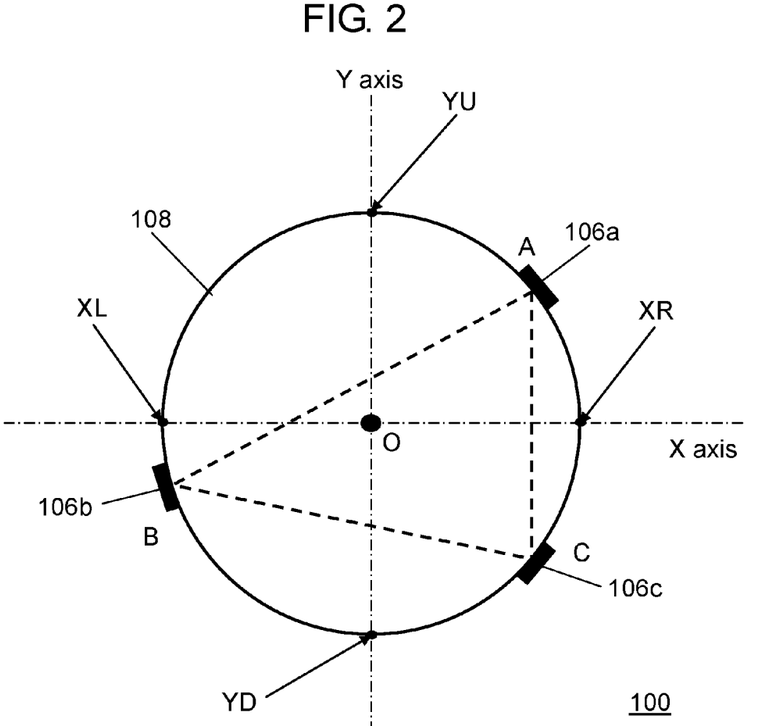
FIG. 2 is a plan view of the optical path changing device according to the first embodiment.

FIG. 1 is a perspective view of optical path changing device 100 for driving an optical member in the present embodiment. FIG. 2 is a plan view of device 100.

As shown in FIG. 1, device 100 includes the following: disk-shaped parallel plate glass 108, which is an optical member, three actuators 101A, 101B, and 101C for driving parallel plate glass 108, and connecting members 106a, 106b, and 106c connecting actuators 101A-101C with parallel plate glass 108. Connecting members 106a, 106b, and 106c connect the peripheral edge of parallel plate glass 108 with movable portions 107a, 107b, and 107c of actuators 101A, 101B, and 101C, respectively, so that actuators 101A-101C support parallel plate glass 108. In that case, movable portions 107a-107c of actuators 101A-101C serve as points of effort, and the connecting points between the peripheral edge of parallel plate glass 108 and connecting members 106a-106c serve as points of load. Movable portions 107a, 107b, and 107c include position sensors 102a, 102b, and 102c, respectively, to detect their positions.

Connecting members 106a-106c connect movable portions 107a-107c of actuators 101A-101C with the periphery of parallel plate glass 108 as shown in FIGS. 1 and 2. As a result, an imaginary triangle ABC with vertices A, B, and C corresponding to the three connecting points can be drawn. The triangle ABC is substantially parallel to the parallel plate face of parallel plate glass 108. Actuators 101A, 101B, and 101C can drive parallel plate glass 108 forward and backward in the normal direction at vertices A, B, and C, respectively. Parallel plate glass 108 has a center of gravity O, which is within the imaginary triangle ABC when seen from the normal direction.

Assume that two axes of rotation (horizontal x axis and vertical y axis) orthogonal to each other at the center of gravity O are set either on the parallel plate face of parallel plate glass 108 or on a flat face parallel to the parallel plate face. In that case, the vertices A and C of the triangle ABC are symmetrical with respect to the x axis. The x axis corresponds to the horizontal side of the screen on which image light that has passed through parallel plate glass 108 is projected. The straight line connecting the vertices A and C is parallel to the y axis. Assume that the xy plane is the screen on which the image light that has passed through parallel plate glass 108 is projected. In that case, the straight line connecting the vertices A and C is parallel to the y axis, which is the axis of rotation and corresponds to the vertical side of the screen. The term "normal direction" of parallel plate glass 108 means the direction perpendicular to the xy plane when the plane of the triangle ABC is on the xy plane including the x and y axes of FIG. 2. In FIG. 2, a point YU and a point YD are points of intersection of the periphery of parallel plate glass 108 and the y axis, whereas a point XR and a point XL are points of intersection of the periphery of parallel plate glass 108 and the x axis.

Figure 3:
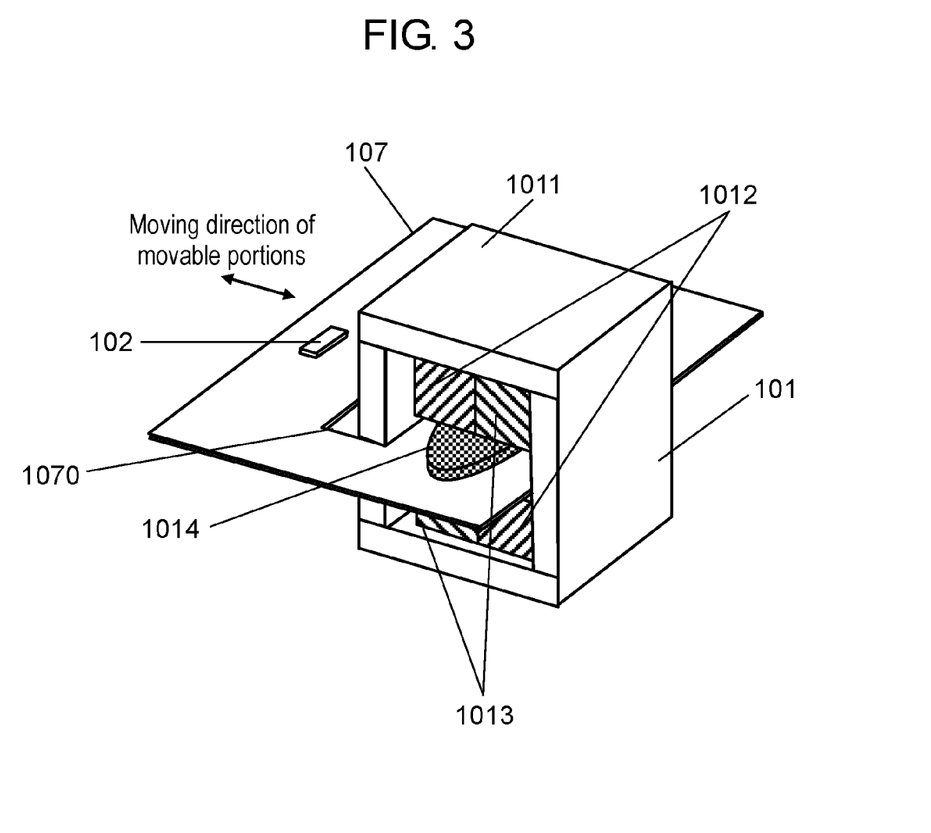
FIG. 3 is a schematic diagram of a voice coil motor used as an actuator in the optical path changing device of the present disclosure.

In the present embodiment, actuators 101A-101C are voice coil motors (VCMs). FIG. 3 is a structural example of one voice coil motor used one of actuators 101A-101C. The motor includes yoke 1011 in which two pairs of permanent magnets (each consisting of N-pole permanent magnet 1012 and S-pole permanent magnet 1013) are opposed to each other with a predetermined space therebetween. Movable portion 107 is interposed between the two pairs of magnets.

Movable portion 107 includes guide window 1070 through which yoke 1011 is inserted. Movable portion 107 also includes coil 1014, which is located between the two pairs of permanent magnets 1012 and 1013. When driving signal current is applied to coil 1014, movable portion 107 moves in the arrow direction (the uniaxial direction). The amount of movement of movable portion 107 varies according to the magnitude of the signal current flowing through coil 1014, and movable portion 107 travels from the reference position either forward or backward. The amounts of movement of movable portions 107a-107c are detected by position detection circuits 103a-103c shown in FIG. 4, based on the signals sent from position sensors 102a-102c attached to movable portions 107a-107c. There is a slight gap between movable portion 107 including coil 1014 and magnets 1012, 1013. Therefore, movable portion 107 is displaced within the gap by an allowable distance when a vertical force is applied in the uniaxial direction in which movable portion 107 is driven by the driving signal current. The moment of the voice coil motor can be small by fixing magnets with a large mass and using a light-weight coil on the movable portion side.

Figure 4:
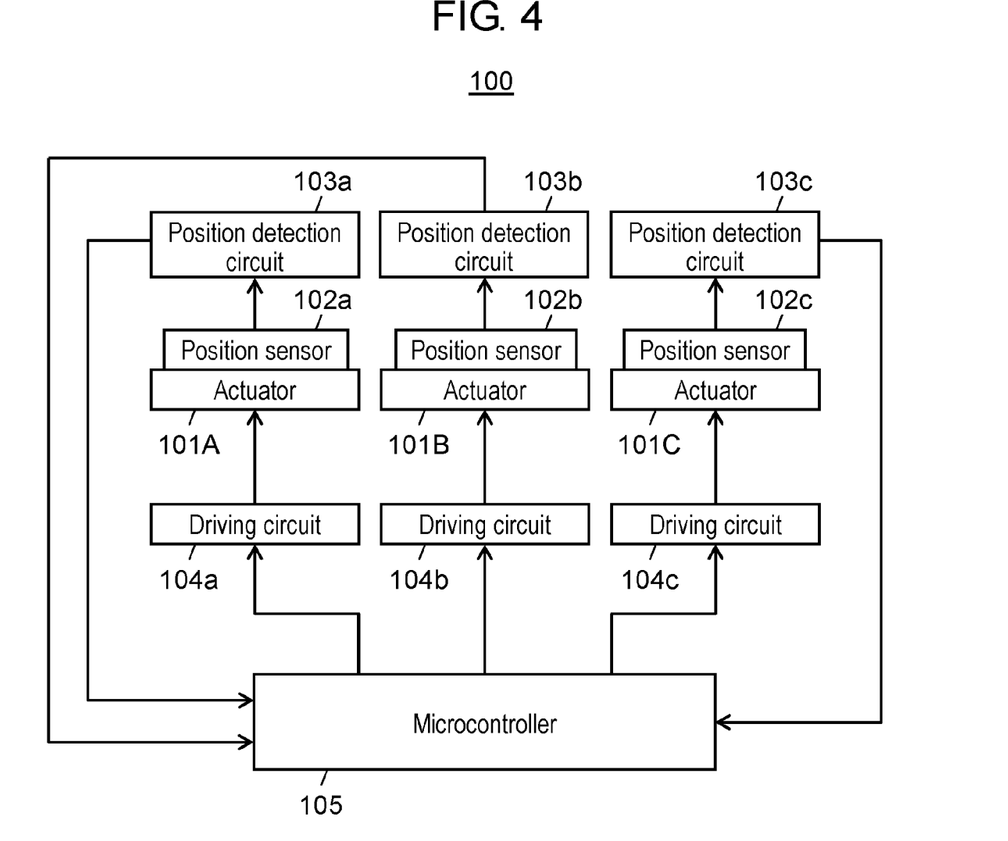
FIG. 4 is a structural block diagram of the optical path changing device according to the present disclosure.

FIG. 4 is a structural block diagram of a driving section in optical path changing device 100. Three actuators 101A, 101B, and 101C are driven by driving circuits 104a, 104b, and 104c, respectively, shown in FIG. 4. Driving circuits 104a-104c are under the control of control signals from microcontroller 105. The driving signal currents from driving circuits 104a-104c drive actuators 101A-101C so that movable portions 107a-107c can move forward and backward in the uniaxial direction (the direction parallel to the optical axis). The positions of movable portions 107a-107c are detected by position detection circuits 103a-103c based on the signals from position sensors 102a-102c attached to movable portions 107a-107c. Circuits 103a-103c generate detection signals by amplifying the signals from position sensors 102a-102c by a predetermined gain.

The detection signals from position detection circuits 103a-103c are received by microcontroller 105. Microcontroller 105 constantly monitors the positions (or the amounts of movement) of movable portions 107a-107c based on the detection signals, thereby serve-controlling actuators 101A-101C.

Operation

The operation of optical path changing device 100 configured as above will be described as follows.

Figure 5:
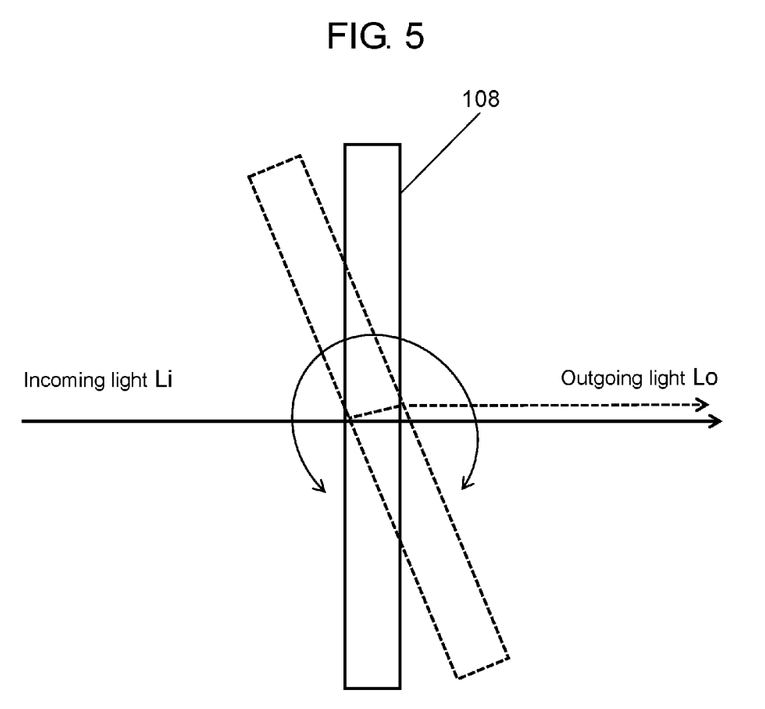
FIG. 5 is a schematic diagram showing the principle of optical path change achieved by inclining a parallel plate glass in the present disclosure.

FIG. 5 is a schematic diagram showing the principle of optical path change achieved by inclining parallel plate glass 108. If the principal face of parallel plate glass 108 is perpendicular to incoming light Li as shown by the solid line in FIG. 5, the light Li goes straight through parallel plate glass 108 without being refracted at the incident plane of parallel plate glass 108. The light Li then leaves the emission plane of parallel plate glass 108 straight without being refracted because the emission plane is also perpendicular to the light Li. Thus, when the incoming light Li is image light, the image (pixels) is not moved.

On the other hand, if parallel plate glass 108 is not perpendicular to the incoming light Li as shown by the dotted line in FIG. 5, the light Li is refracted at the incident plane of parallel plate glass 108, goes straight through parallel plate glass 108, and is refracted at the emission plane.

The light Li has the same angle of refraction both when incident on parallel plate glass 108 and when emitted from parallel plate glass 108. Therefore, when the incoming light Li is image light, outgoing light Lo of the image light travels in parallel with the inclination of parallel plate glass 108. This results in moving the display position of the image projected through parallel plate glass 108.

Figure 6A:
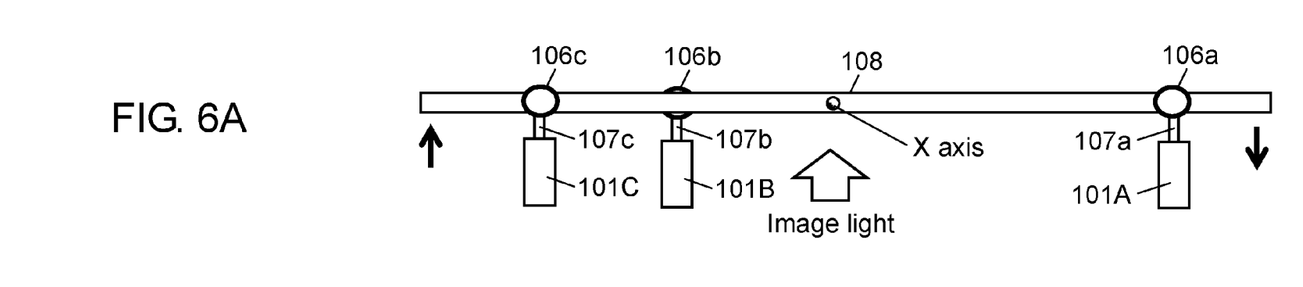
FIGS. 6A to 6C are schematic diagrams showing the inclination of the parallel plate glass in the first embodiment.
Figure 6B:
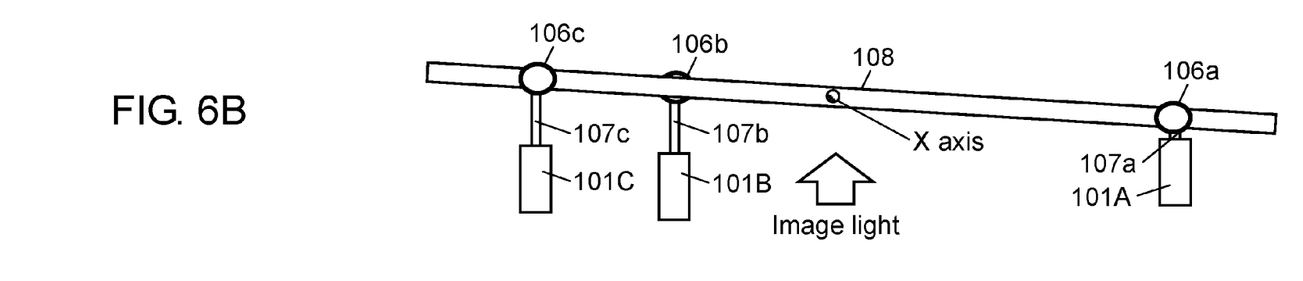
Figure 6C:
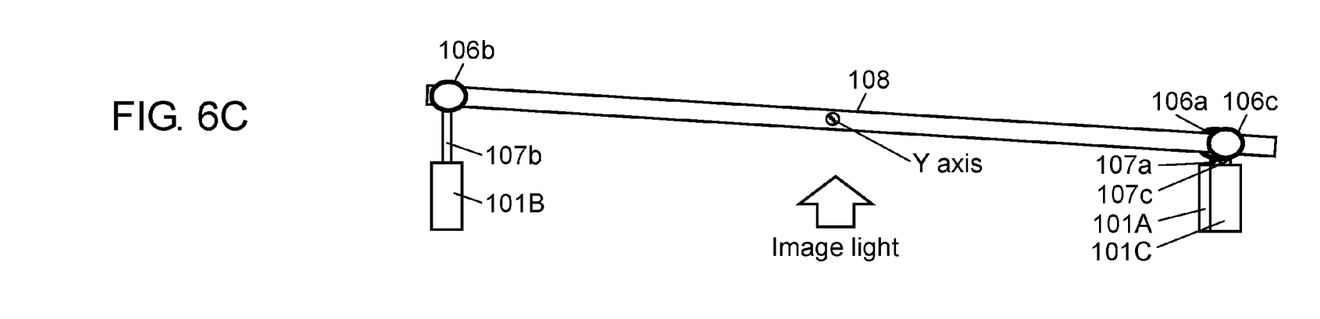

FIGS. 6A to 6C are schematic diagrams showing the principle of inclining parallel plate glass 108. FIG. 6A shows a state in which parallel plate glass 108 is perpendicular to the optical axis of image light. FIG. 6B shows a state in which parallel plate glass 108 is inclined with respect to the x axis as the axis of rotation. FIG. 6C shows a state in which parallel plate glass 108 is inclined with respect to the y axis as the axis of rotation.

Parallel plate glass 108 can be displaced with respect to the x axis of rotation, for example, from the state of FIG. 6A to the state of FIG. 6B as follows. Movable portion 107a of actuator 101A is displaced downward, whereas actuators 101B and 101C are synchronously displaced upward only by the same amount of displacement as actuator 101A. In the same manner, parallel plate glass 108 can be displaced with respect to the y axis of rotation, for example, from the state of FIG. 6A to the state of FIG. 6C as follows. Movable portions 107a and 107c of actuators 101A and 101C are displaced downward, whereas actuator 101B is displaced upward. Thus, actuators 101 opposed to each other with respect to the x or y axis can be displaced in opposite directions to each other, thereby inclining parallel plate glass 108.

Parallel plate glass 108 can be inclined by actuators 101A-101C based on this principle, so that the input image light can be moved to different positions and projected.

Figure 7:
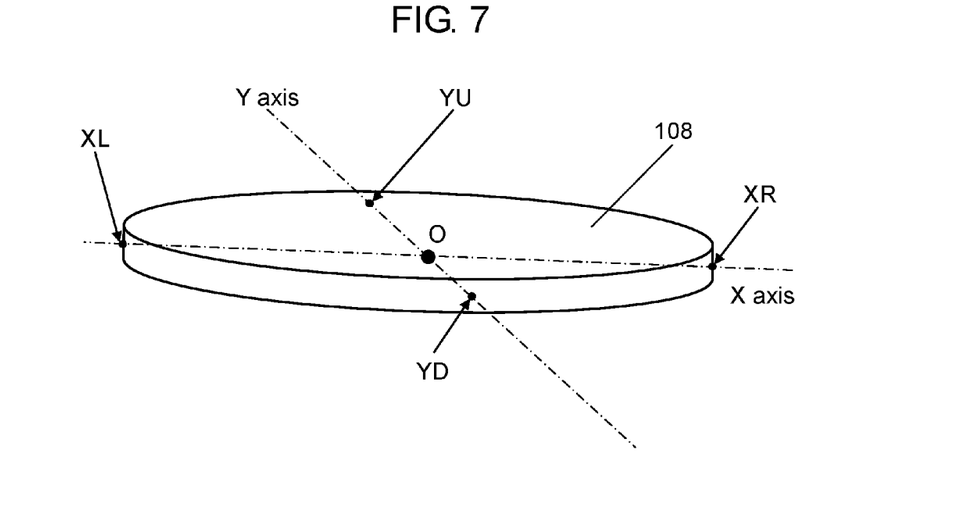
FIG. 7 shows the axes of rotation of the parallel plate glass in the present disclosure.
Figure 8:
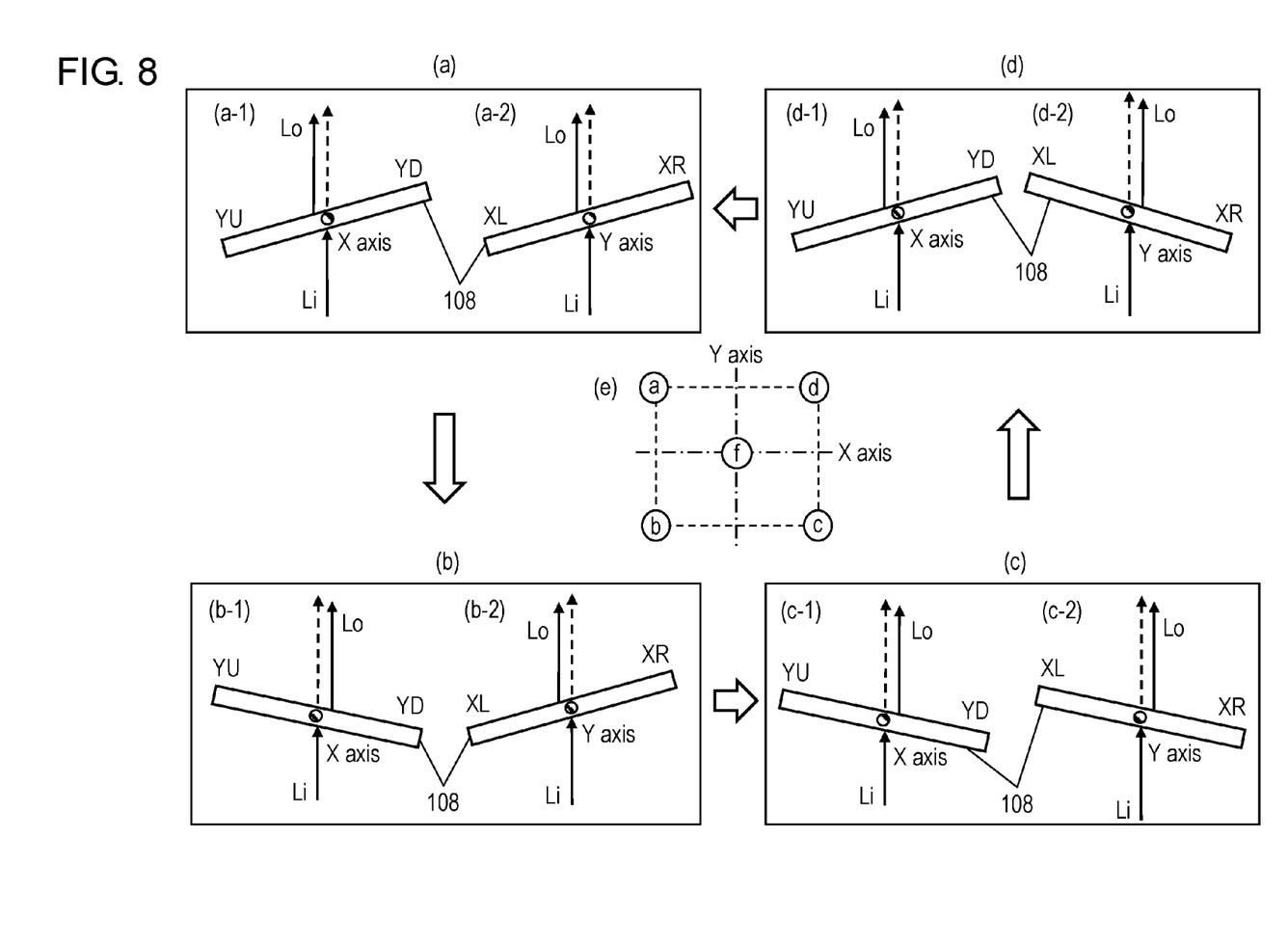
FIG. 8 is a schematic diagram showing the principle of optical path change of input image light achieved by inclining the parallel plate glass and also showing the principle of pixel shift in the present disclosure.

FIGS. 7 and 8 are schematic diagrams for controlling actuators 101A-101C in order to incline parallel plate glass 108.

As shown in FIG. 7, the x and y axes cross each other at the center of the same plane. The center of the plane substantially coincides with the center of gravity O of parallel plate glass 108. The x and y axes can be inclined while the center of the plane is kept at a constant position, so that parallel plate glass 108 can be inclined and the display position of the pixels can be moved two dimensionally. The operation of actuators 101A-101C to move the display position of pixels will now be described with reference to FIG. 8.

FIG. 8 is a schematic diagram of the operation of actuators 101A-101C in order to move the display position of the pixels. In FIG. 8, (a)-(d) are schematic diagrams of the control of parallel plate glass 108, and (e) shows the display positions of pixels moving with the inclination of parallel plate glass 108.

In FIG. 8, the dotted line arrows show the outgoing light Lo when the incoming light Li is vertically incident on parallel plate glass 108, or in other words, when parallel plate glass 108 is in the horizontal position. When the incoming light Li is image light, the outgoing light Lo as pixels is displayed on the position "f" shown in (e) of FIG. 8. This state is hereinafter referred to as "reference state". Actuators 101A-101C can be driven to incline parallel plate glass 108, thereby shifting the display position of the pixels to the positions "a"-"d".

In FIG. 8, a point XR and a point XL are points of intersection of the periphery of parallel plate glass 108 and the x axis, whereas a point YU and a point YD are points of intersection of the periphery of parallel plate glass 108 and the y axis of FIG. 2.

The position "a" shown in (e) of FIG. 8 represents the position of the pixels displayed on the projection face when parallel plate glass 108 is in the first state shown in (a) of FIG. 8. In the first state, as shown in (a-1) of FIG. 8, actuator 101A moves the point YU downward, whereas actuators 101B and 101C move the point YD upward by the same amount of displacement as at the point YU. At the same time, as shown in (a-2) of FIG. 8, actuator 101B moves the point XL downward, whereas actuators 101A and 101C move the point XR upward by the same amount of displacement as at the point XL. As a result, the pixels can be displayed at the position "a" shown in (e) of FIG. 8.

The position "b" shown in (e) of FIG. 8 represents the position of the pixels displayed on the projection face when parallel plate glass 108 is in the second state shown in (b) of FIG. 8. In the second state, as shown in (b-1) of FIG. 8, actuator 101A moves the point YU upward, whereas actuators 101B and 101C move the point YD downward by the same amount of displacement as at the point YU. At the same time, as shown in (b-2) of FIG. 8, actuator 101B moves the point XL downward, whereas actuators 101A and 101C move the point XR upward by the same amount of displacement as at the point XL. As a result, the pixels can be displayed at the position "b" shown in (e) of FIG. 8.

The position "c" shown in (e) of FIG. 8 represents the position of the pixels displayed on the projection face when parallel plate glass 108 is in the third state shown in (c) of FIG. 8. In the third state, as shown in (c-1) of FIG. 8, actuator 101A moves the point YU upward, whereas actuators 101B and 101C move the point YD downward by the same amount of displacement as at the point YU. At the same time, as shown in (c-2) of FIG. 8, actuator 101B moves the point XL upward, whereas actuators 101A and 101C move the point XR downward by the same amount of displacement as at the point XL. As a result, the pixels can be displayed at the position "c" shown in (e) of FIG. 8.

The position "d" shown in (e) of FIG. 8 represents the position of the pixels displayed on the projection face when parallel plate glass 108 is in the fourth state shown in (d) of FIG. 8. In the fourth state, as shown in (d-1) of FIG. 8, actuator 101A moves the point YU downward, whereas actuators 101B and 101C move the point YD upward by the same amount of displacement as at the point YU. At the same time, as shown in (d-2) of FIG. 8, actuator 101B moves the point XL upward, whereas actuators 101A and 101C move the point XR downward by the same amount of displacement as at the point XL. As a result, the pixels can be displayed at the position "d" shown in (e) of FIG. 8.

The image light can be incident on the parallel plate glass at the timing at which the parallel plate glass comes into each of the first-fourth states shown in (a)-(d) of FIG. 8 to display the pixels at the four different positions "a"-"d" shown in (e) of FIG. 8.

Effects and Others

Optical path changing device 100 according to the present embodiment includes parallel plate glass 108 for changing an optical path, and actuators 101A-101C including movable portions 107a-107c which are moved in the uniaxial direction by drive signals. Connecting members 106a-106c connect the peripheral edge of parallel plate glass 108 with movable portions 107a-107c of the actuators 101A-101C. The center of gravity O of parallel plate glass 108 is within the triangle ABC with the vertices A, B, and C corresponding to the connecting points of connecting members 106a-106c and the peripheral edge of parallel plate glass 108. Position detection circuits 103a-103c make position sensors 102a-102c detect the amounts of movement of movable portions 107a-107c of actuators 101A-101C and output detection signals. Microcontroller 105 controls the movement of movable portions 107a-107c of actuators 101A-101C, based on these detection signals.

With this configuration, the amounts of displacement of movable portions 107a-107c are controlled by a combination of the actuators, allowing the control of the inclination of parallel plate glass 108 with respect to two orthogonal axes of rotation (the x and y axes). Consequently, signals to control the amounts of movement of movable portions 107a-107c are applied to three actuators 101A-101C, so that the projection images can be moved horizontally and vertically. This achieves an optical path changing device that can easily control the direction of moving the display position of images.

Second Exemplary Embodiment

An optical path changing device according to a second embodiment differs in the arrangement and operation of actuators 101A-101C from the optical path changing device of the first embodiment. The following description of the second embodiment will be focused on differences from the first embodiment, and the same description will not be repeated.

Figure 9:
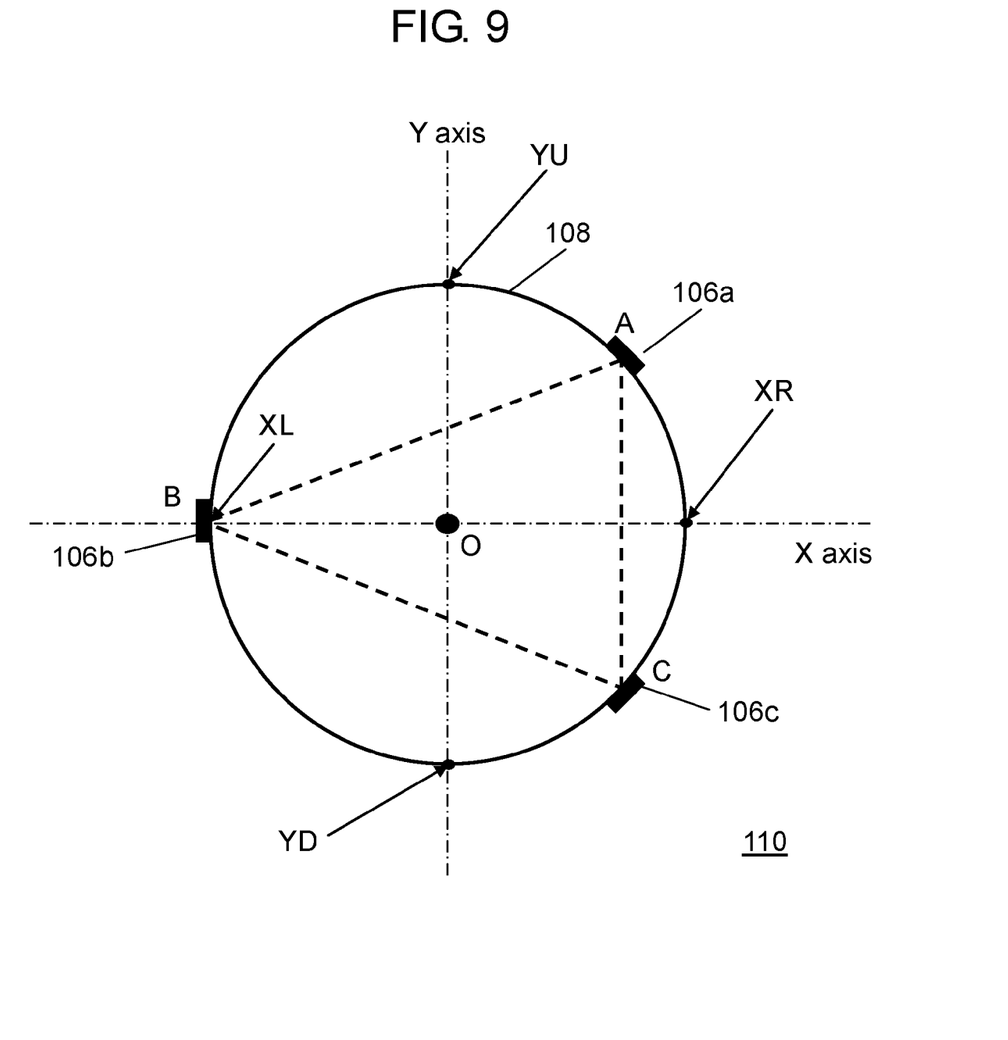
FIG. 9 is a plan view of an optical path changing device according to a second embodiment.

FIG. 9 shows the arrangement of actuators 101A-101C of optical path changing device 110 according to the second embodiment.

Connecting members 106a-106c connecting movable portions 107a-107c of actuators 101A-101C with the periphery of parallel plate glass 108 are located at the vertices A, B, and C of an isosceles triangle ABC imaginarily drawn on parallel plate glass 108 as shown in FIG. 9. The center of gravity O of parallel plate glass 108 is within the isosceles triangle ABC. In addition, two axes of rotation (x and y axes) are drawn crossing orthogonally at the center of gravity O of the glass. The vertex B (second vertex) between the two equal sides of the isosceles triangle ABC is located on the x axis. The vertex B is at the same position as the point XL, which is at the point of intersection of the periphery of disk-shaped parallel plate glass 108 and the x axis. At the vertex B, connecting member 106b connected with actuator 101B (second actuator) is located.

At the vertex A of the isosceles triangle ABC, connecting member 106a connected with actuator 101A (first actuator) is located. At the vertex C of the isosceles triangle ABC, connecting member 106c connected with actuator 101C (third actuator) is located. In that case, the straight line (base AC) connecting the vertices A and C is parallel to the axis of rotation (the y axis in FIG. 9), which is different from the axis of rotation on which the vertex B is located. The vertices A-C at which actuators 101A-101C are connected with connecting members 106a-106c serve as points of load of actuators 101A-101C. Actuators 101A-101C drive parallel plate glass 108 forward and backward in the normal direction of the parallel plate face at the vertices A-C.

The rotation of parallel plate glass 108 about the x axis (first axis of rotation) is driven by actuators 101A and 101C. The x axis is the same as the axis of symmetry of the example of FIG. 9, and is parallel to the axis of symmetry of the isosceles triangle ABC. Meanwhile, the rotation about the y axis (second axis of rotation) orthogonal to the x axis is driven by actuators 101A-101C.

Figure 10A:
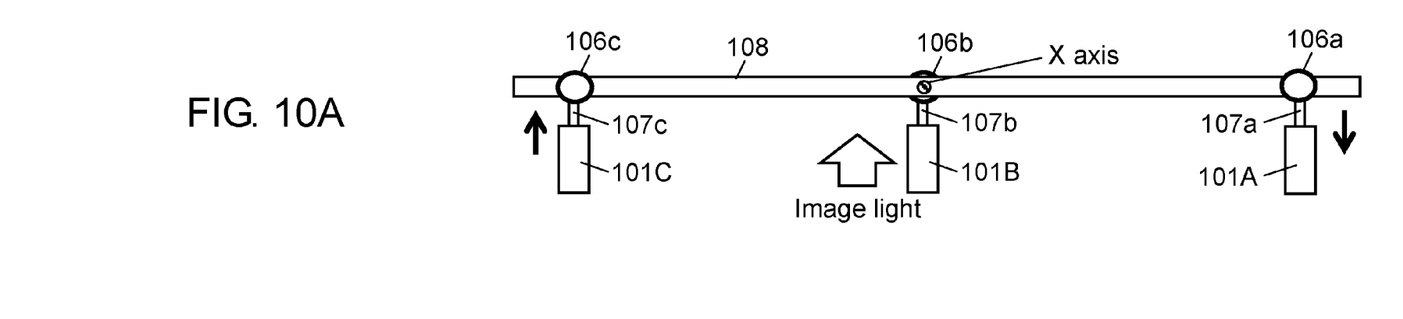
FIGS. 10A to 10C are schematic diagrams showing the inclination of the parallel plate glass in the second embodiment.
Figure 10B:
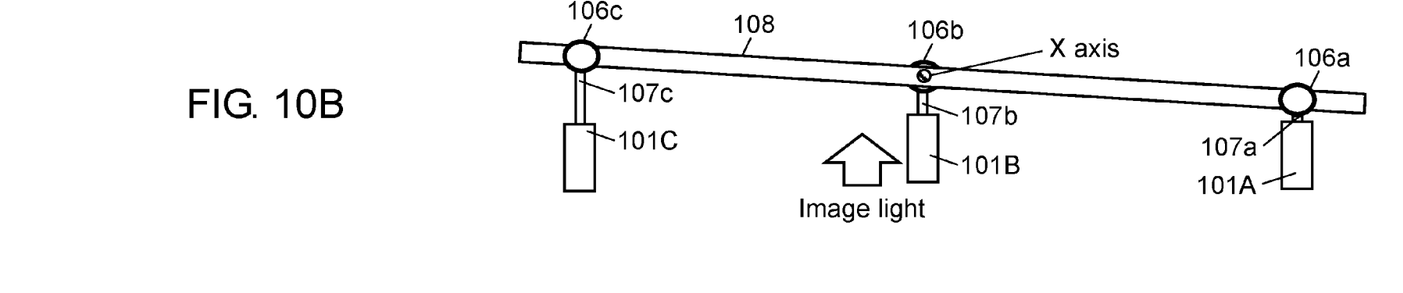
Figure 10C:
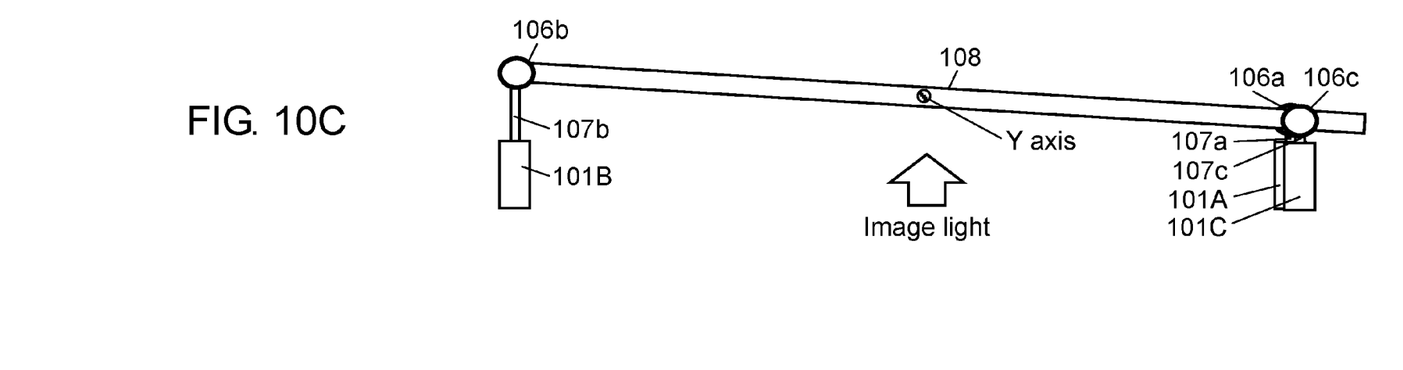

FIGS. 10A to 10C are schematic diagrams showing the principle of inclining parallel plate glass 108. FIG. 10A shows a state in which parallel plate glass 108 is perpendicular to the optical axis of image light. FIG. 10B shows a state in which parallel plate glass 108 is inclined with respect to the x axis as the axis of rotation. FIG. 10C shows a state in which parallel plate glass 108 is inclined with respect to the y axis as the axis of rotation.

Parallel plate glass 108 can be displaced with respect to the x axis of rotation, for example, from the state of FIG. 10A to the state of FIG. 10B as follows. Movable portion 107a of actuator 101A is displaced downward and movable portion 107b of actuator 101B is left undisplaced, whereas movable portion 107c of actuator 101C is displaced upward by the same amount of displacement as movable portion 107a of actuator 101A.

In the same manner, parallel plate glass 108 can be inclined with respect to the y axis of rotation from the state of FIG. 10A to the state of FIG. 10C as follows. Movable portion 107b of actuator 101B is displaced upward, whereas actuators 101A and 101C are synchronously displaced downward so that the points XR and XL shown in FIG. 9 have the same amount of displacement. Thus, actuators 101 opposed to each other with respect to the x or y axis can be displaced in opposite directions to each other, thereby inclining parallel plate glass 108.

The operation of actuators 101A-101C to move the display position of pixels will now be described with reference to FIG. 8 used in the first embodiment.

In the same manner as in the first embodiment, actuators 101A-101C are driven to incline parallel plate glass 108, so that the display position of the pixels can be shifted to the positions "a"-"d" shown in (e) of FIG. 8.

In FIG. 8, a point XR and a point XL are points of intersection of the periphery of parallel plate glass 108 and the x axis, whereas a point YU and a point YD are points of intersection of the periphery of parallel plate glass 108 and the y axis of FIG. 9.

The position "a" shown in (e) of FIG. 8 represents the position of the pixels displayed on the projection face when parallel plate glass 108 is in the first state shown in (a) of FIG. 8. In the first state, as shown in (a-1) of FIG. 8, actuator 101A moves the point YU downward, whereas actuator 101C moves the point YD upward by the same amount of displacement as at the point YU. At the same time, as shown in (a-2) of FIG. 8, actuator 101B moves the point XL downward, whereas actuators 101A and 101C move the point XR upward by the same amount of displacement as at the point XL. Hence, actuators 101A and 101C move parallel plate glass 108 by the amount of displacement corresponding to the sum of the amounts about the x and y axes. As a result, the pixels can be displayed at the position "a" shown in (e) of FIG. 8.

The position "b" shown in (e) of FIG. 8 represents the position of the pixels displayed on the projection face when parallel plate glass 108 is in the second state shown in (b) of FIG. 8. In the second state, as shown in (b-1) of FIG. 8, actuator 101A moves the point YU upward, whereas actuator 101C moves the point YD downward by the same amount of displacement as at the point YU. At the same time, as shown in (b-2) of FIG. 8, actuator 101B moves the point XL downward, whereas actuators 101A and 101C move the point XR upward by the same amount of displacement as at the point XL. As a result, the pixels can be displayed at the position "b" shown in (e) of FIG. 8.

The position "c" shown in (e) of FIG. 8 represents the position of the pixels displayed on the projection face when parallel plate glass 108 is in the third state shown in (c) of FIG. 8. In the third state, as shown in (c-1) of FIG. 8, actuator 101A moves the point YU upward, whereas actuator 101C moves the point YD downward by the same amount of displacement as at the point YU. At the same time, as shown in (c-2) of FIG. 8, actuator 101B moves the point XL upward, whereas actuators 101A and 101C move the point XR downward by the same amount of displacement as at the point XL. As a result, the pixels can be displayed at the position "c" shown in (e) of FIG. 8.

The position "d" shown in (e) of FIG. 8 represents the position of the pixels displayed on the projection face when parallel plate glass 108 is in the fourth state shown in (d) of FIG. 8. In the fourth state, as shown in (d-1) of FIG. 8, actuator 101A moves the point YU downward, whereas actuator 101C moves the point YD upward by the same amount of displacement as at the point YU. At the same time, as shown in (d-2) of FIG. 8, actuator 101B moves the point XL upward, whereas actuators 101A and 101C move the point XR downward by the same amount of displacement as at the point XL. As a result, the pixels can be displayed at the position "d" shown in (e) of FIG. 8.

Effects and Others

According to the present embodiment, an isosceles triangle ABC is formed whose vertices A, B, and C correspond to the three connecting points of connecting members 106a-106c connected with parallel plate glass 108. Three actuators 101A-101C are located so that the vertex (second vertex) between the two equal sides of the isosceles triangle ABC can be located on one of the two orthogonal axes of rotation (the x or y axis). This allows easier control of the amounts of displacement of the movable portions than in the first embodiment, so that the inclination of parallel plate glass 108 can be controlled with respect to the two orthogonal axes (the x and y axes).

In the present embodiment, as shown in FIG. 9, the isosceles triangle ABC is located so that the vertex B between the two equal sides can be located on the x axis, and that the vertices A and C can be symmetrical with respect to the x axis. Alternatively, the vertex B may be located on the y axis, and the vertices A and C may be symmetrical with respect to the y axis. However, the movement of the pixels in the vertical direction of the screen needs to be more accurate than in the horizontal direction. It is therefore preferable that the vertices A and C should be symmetrical with respect to the x axis, which is the axis of rotation of parallel plate glass 108 to move the pixels in the vertical direction, and that the vertex B should be located on the x axis.

Also, in the present embodiment, as shown in FIG. 9, the base AC of the isosceles triangle ABC, which connects points of load of actuators 101A-101C to rotate parallel plate glass 108, is shorter than the equal sides BA and BC. When the base AC is long, the base AC is too close to the y axis, so that the moment required to rotate parallel plate glass 108 about the y axis is too large. On the other hand, when the base AC is short, the vertices A and C are too close to the x axis, so that the moment required to rotate parallel plate glass 108 about the x axis is too large. Hence, considering the moment required to rotate parallel plate glass 108, it is preferable that the vertices A and C should be located to make the vertices A and C substantially equidistant from the x and y axes, or in other words, to make an angle AOC (formed by line segments OA and OC) 90 degrees.

Third Exemplary Embodiment

The optical path changing devices disclosed in the first and second embodiments can be used in projection image display apparatus 200.

Figure 11:
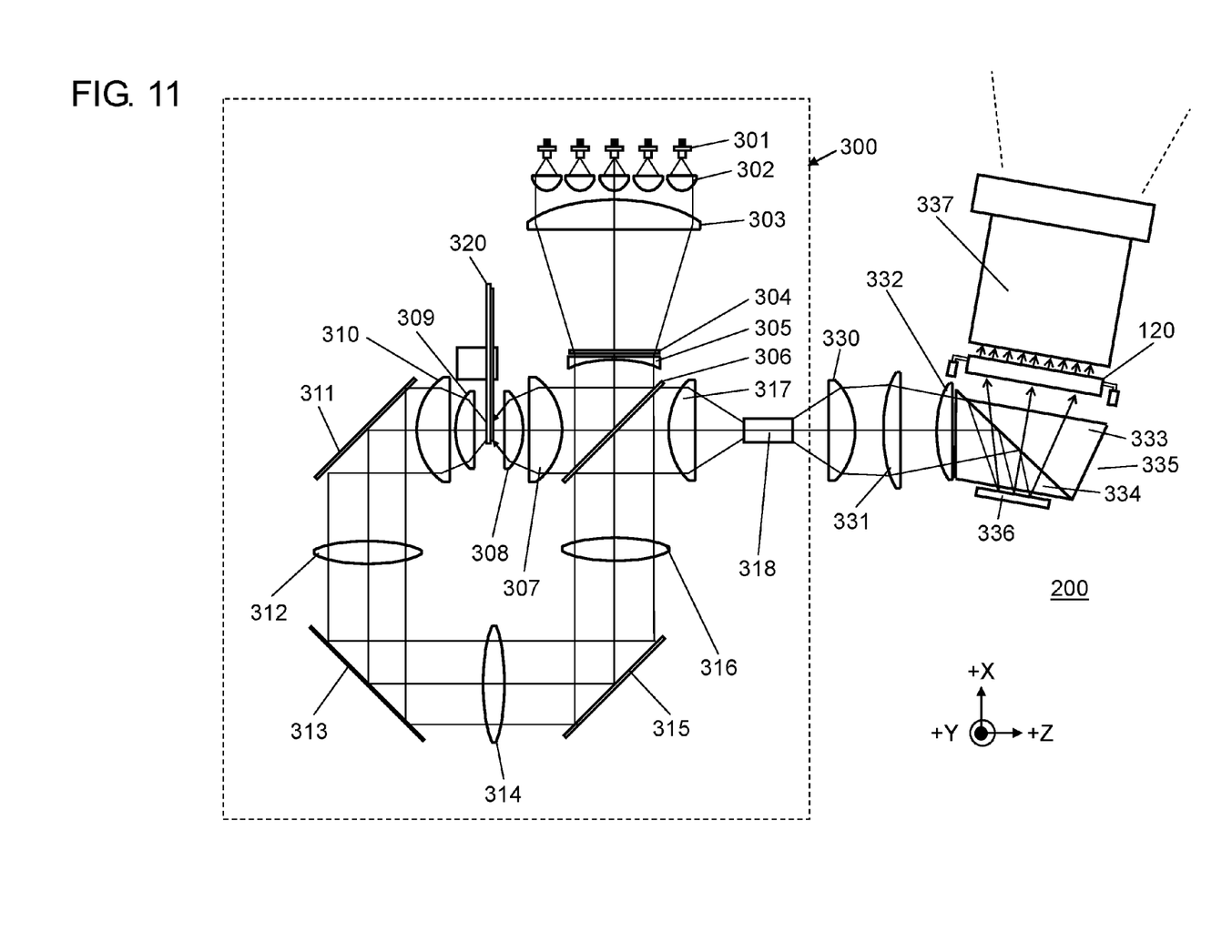
FIG. 11 is a configuration diagram of a projection image display apparatus according to the present disclosure.

FIG. 11 is a schematic configuration diagram of the optical system of projection image display apparatus 200 including optical path changing device 100 or 110 of the present disclosure. In the following description, an XYZ rectangular coordinate system is defined as shown in FIG. 11.

First, illumination optical system 300 of projection image display apparatus 200 will be described as follows. Illumination optical system 300 includes a laser light source, as an illuminating device with a high luminance, composed of a plurality of blue semiconductor lasers 301. The laser beams emitted from lasers 301 are collimated by respective collimator lens 302. The laser beams emitted from collimator lens 302 are approximately paralleled, collected by condenser lens 303, made to pass through diffused plate 304, and again approximately paralleled by lens 305. The approximately paralleled laser beams are then incident on dichroic mirror 306, which is inclined at an angle of about 45 degrees with respect to the optical axis.

Diffused plate 304 is a flat glass plate with a diffusing face having asperities. Dichroic mirror 306 has the property of reflecting the light with the wavelength of blue semiconductor lasers 301 and also making light with the other wavelengths pass through it.

The laser beams incident on dichroic mirror 306 in the −X direction are reflected and emitted from mirror 306 in the −Z direction. After this, the laser beams are collected by condenser lenses 307 and 308 and excite the phosphors formed on phosphor wheel 320.

Phosphor wheel 320 includes a disk-shaped substrate on which red and green phosphor segments are formed in the circumferential direction, and also an opening is formed as a light-transmitting region.

The red and green beams obtained from the red and green phosphors, respectively, are emitted from phosphor wheel 320. These beams are substantially paralleled by condenser lenses 308 and 307, made to pass through dichroic mirror 306, collected by condenser lens 317, and incident on rod integrator 318.

On the other hand, the blue beams, which have been emitted from blue semiconductor lasers 301 and then have passed through the opening of phosphor wheel 320 go through lens 309, lens 310, mirror 311, lens 312, mirror 313, lens 314, mirror 315, and lens 316 in that order. After this, the blue beams are reflected by dichroic mirror 306, collected by condenser lens 317, and incident on rod integrator 318. Lenses 312, 314, and 316 function as relay lenses.

The light emitted from rod integrator 318 goes through lenses 330, 331, and 332, and is incident on total internal reflection prism 335 composed of a pair of prisms 333 and 334. The incident light is modulated by an image signal at digital mirror device (DMD) 336, which is an optical modulator element. The modulated light is emitted as image light. Lenses 330 and 331 are relay lenses. Lens 332 has the function of making the light on the emission plane of rod integrator 318 formed into images on DMD 336.

The image light emitted from DMD 336 is incident on optical path changing device 120, which can be either optical path changing device 100 or 110 disclosed in the first and second embodiments. The light that has passed through device 120 is incident on projection lens 337, emitted from it as image light, magnified, and projected on the screen.

Projection image display apparatus 200 can perform wobbling display using the function of device 120 to move the display position of image light. The term "wobbling display" means to display different images in one frame period of an input image by shifting the display position a plurality of times so as to equivalently improve the resolution of the display image. This method is also called the pixel shift display. Microcontroller 105 shown in FIG. 4 drives actuators 101A-101C by the control signals synchronized with the drive of DMD 336.

Other Exemplary Embodiments

The first to third embodiments have been described as technical examples of the present application. The techniques of the present disclosure are not limited to the embodiments and are applicable to other exemplary embodiments provided with modification, replacement, addition, omission, etc. It would also be possible to provide additional exemplary embodiments by combining some of the components used in the first to third embodiments. The other embodiments will now be exemplified as follows.

In the above-described embodiments, the parallel plate glass, through which the incoming light passes, is held at its periphery, but can alternatively be held by other methods. For example, the parallel plate glass can be fit into a frame with arms, and connecting members to be connected with the actuators can be attached to the arms. The parallel plate glass can have any shape with a flat face to allow the optical path to pass through it, instead of the disk-shape. The above-described optical path changing device includes a transparent plate as the optical element and voice coil motors as the actuators; alternatively however, the optical element can be a lens group, and the actuators can be piezoelectric elements.

The above-described embodiments have described only the case of driving about two orthogonal axes of rotation; alternatively, it is possible to drive about one axis or to have the function of switching the drive between one and two axes. In the case of driving about one axis, the vertex between the two equal sides of the isosceles triangle may be located on the axis of rotation, and the actuators located on the other two vertices (located symmetrical with respect to the axis of rotation) may be driven.

In the above-described embodiments, the illumination optical system includes the laser light source, but may alternatively include other types of light sources, such as a lamp light source or an LED light source. The optical path changing device is located between DMD 336 and projection lens 337; however, it may be located anywhere between DMD 336 and the projection face, such as behind projection lens 337.

The above-described embodiments are only to exemplify the techniques of the present disclosure. Therefore, various modification, replacement, addition, and omission can be made within the range of the claims and their equivalents.

INDUSTRIAL APPLICABILITY

The optical path changing device of the present disclosure can be used in a projection image display apparatus, such as a projector.

What is claimed is:

1. An optical path changing device comprising:
   an optical member having a parallel plate face for changing an optical path; and
   first actuator, second actuator, and third actuator respectively connected with the optical member at first vertex, second vertex, and third vertex of a triangle imaginarily drawn on a plane parallel to the parallel plate face of the optical member, and respectively driving the optical member forward and backward in a normal direction of the parallel plate face at the first vertex, the second vertex, and the third vertex serving as points of load,
   wherein the optical member has a center of gravity within the triangle when seen from the normal direction, and
   wherein movement of the optical member is controlled only by the first actuator, the second actuator and the third actuator.

2. The optical path changing device of claim 1, wherein
   the optical member is driven about first axis and second axis of rotation orthogonal at the center of gravity of the optical member and parallel to the parallel plate face, and
   one side of the triangle is parallel to the second axis of rotation.

3. The optical path changing device of claim 2, wherein the second axis of rotation corresponds to a vertical side of a screen on which image light is projected after passing through the optical member.

4. The optical path changing device of claim 2, wherein two of the first vertex, the second vertex, and the third vertex of the triangle are symmetrical with respect to the first axis of rotation.

5. The optical path changing device of claim 4, wherein the first axis of rotation corresponds to a horizontal side of a screen on which image light is projected after passing through the optical member.

6. The optical path changing device of claim 2, wherein the triangle is an isosceles triangle.

7. The optical path changing device of claim 6, wherein
   the second actuator acts on the second vertex between two equal sides of the isosceles triangle,
   the first actuator and the third actuator act on the first vertex and the third vertex, respectively,
   the first axis of rotation is parallel to an axis of symmetry of the isosceles triangle,
   the optical member is driven about the first axis of rotation by the first actuator and the third actuator, and
   the optical member is driven about the second axis of rotation by the first actuator, the second actuator, and the third actuator.

8. A projection image display apparatus comprising:
   a light source;
   an optical modulator element for modulating light from the light source into image light by using an image signal;
   a projection optical system for magnifying and projecting the image light; and
   the optical path changing device of claim 1 disposed between the optical modulator element and the projection optical system.

* * * * *